(12) United States Patent
Manson et al.

(10) Patent No.: US 7,841,011 B2
(45) Date of Patent: Nov. 23, 2010

(54) METHODS AND APPARATUSES FOR TIERED OPTION SPECIFICATION

(75) Inventors: Nicholas Roy Manson, Kitchener (CA); Jonathan Robert Bezeau, Waterloo (CA); David Hamm, Toronto (CA); Dennis Gordon Snowdon, Toronto (CA)

(73) Assignee: Siebel Systems, Inc., San Mateo, CA (US)

( * ) Notice: Subject to any disclaimer, the term of this patent is extended or adjusted under 35 U.S.C. 154(b) by 1014 days.

(21) Appl. No.: 11/001,257

(22) Filed: Nov. 30, 2004

(65) Prior Publication Data

US 2007/0240106 A1   Oct. 11, 2007

(51) Int. Cl.
G06F 7/04 (2006.01)
G06F 3/00 (2006.01)
G06F 15/177 (2006.01)

(52) U.S. Cl. .......................... 726/28; 726/27; 715/733; 715/734; 715/742; 715/744; 715/745

(58) Field of Classification Search .................. None
See application file for complete search history.

(56) References Cited

U.S. PATENT DOCUMENTS

| | | | |
|---|---|---|---|
| 5,842,193 A | 11/1998 | Reilly | 706/45 |
| 5,963,910 A | 10/1999 | Ulwick | 707/7 |
| 6,249,769 B1 | 6/2001 | Ruffin et al. | 707/7 |
| 6,311,144 B1 | 10/2001 | Abu El Ata | 703/2 |
| 6,411,936 B1 | 6/2002 | Sanders | 705/10 |
| 6,502,193 B1 | 12/2002 | Barber | 713/201 |
| 6,513,111 B2 | 1/2003 | Klimczak et al. | 713/1 |
| 6,523,027 B1 | 2/2003 | Underwood | 707/4 |
| 6,970,927 B1 | 11/2005 | Steward et al. | 709/225 |
| 7,035,825 B1 | 4/2006 | Sturtevant et al. | 705/51 |
| 7,107,285 B2 * | 9/2006 | von Kaenel et al. | 707/104.1 |
| 7,321,894 B2 | 1/2008 | Degtyar et al. | 707/101 |
| 2002/0059283 A1 | 5/2002 | Shapiro et al. | 707/100 |
| 2002/0107864 A1 | 8/2002 | Battas et al. | 707/101 |
| 2002/0140731 A1 | 10/2002 | Subramaniam et al. | 345/762 |
| 2003/0046661 A1 | 3/2003 | Farber et al. | 717/107 |
| 2003/0069780 A1 | 4/2003 | Hailwood et al. | 705/10 |
| 2004/0093397 A1 | 5/2004 | Chiroglazov et al. | 709/219 |
| 2004/0117358 A1 * | 6/2004 | von Kaenel et al. | 707/3 |
| 2004/0133587 A1 * | 7/2004 | Matsumoto et al. | 707/102 |
| 2004/0133876 A1 * | 7/2004 | Sproule | 717/105 |
| 2004/0143470 A1 | 7/2004 | Myrick et al. | 707/7 |

(Continued)

OTHER PUBLICATIONS

Zhuomin Gao, "Conflit Handling in Policy-Based Security Management", 2002, University of Florida, pp. 1-52.*

(Continued)

*Primary Examiner*—Michael J Yigdall
*Assistant Examiner*—Ben C Wang
(74) *Attorney, Agent, or Firm*—Campbell Stephenson LLP

(57) ABSTRACT

Methods and apparatuses for tiered customization for an application with a plurality of users. In one embodiment, an application with various options for different users has a tiered system for customization to provide cost efficiency. For example, in a tiered system for customization, multiple option values can be specified for one option at multiple tiers of user group hierarchy and resolved based on the tier hierarchy to balance the capability for deep customizability, and the efficiency of resource usage. For example, a deep customizable hosted Customer Relationship Management (CRM) application allows customization from company level to individual user level.

18 Claims, 10 Drawing Sheets

U.S. PATENT DOCUMENTS

| | | | |
|---|---|---|---|
| 2004/0143749 A1* | 7/2004 | Tajalli et al. | 713/200 |
| 2004/0162906 A1* | 8/2004 | Griffin et al. | 709/229 |
| 2005/0076330 A1 | 4/2005 | Almgren et al. | 717/113 |
| 2005/0108578 A1* | 5/2005 | Tajalli et al. | 713/201 |
| 2005/0289524 A1* | 12/2005 | McGinnes | 717/140 |
| 2006/0167942 A1* | 7/2006 | Lucas et al. | 707/104.1 |
| 2007/0067373 A1 | 3/2007 | Higgins et al. | 707/206 |
| 2007/0208576 A1 | 9/2007 | Lee et al. | 705/1 |
| 2007/0226241 A1 | 9/2007 | Ng et al. | 707/102 |
| 2007/0239467 A1 | 10/2007 | Bezeau et al. | 705/1 |

OTHER PUBLICATIONS www.wikipedia.org., "Serialization," Nov. 27, 2003.

* cited by examiner

METHODS AND APPARATUSES FOR TIERED OPTION SPECIFICATION

FIELD OF THE TECHNOLOGY

The invention relates to customization of applications, and more particularly to the customization of applications for multiple users.

BACKGROUND

A Customer Relationship Management (CRM) application is traditionally an enterprise-wide application that allows companies to manage aspects of their relationship with their customers. Typically, a CRM application provides business processes that operate on business entities.

Examples of business entities include a lead or an account. Business entities typically have many attributes that describe their state.

A business process operates across one or more business entities. A set of available business processes defines the possible entity states and state transitions. An example of a business process is lead conversion: the process of turning leads into accounts.

A CRM application is typically specialized for a particular industry to deal with the business problems of a specific field. There are many business fields in which different vertical CRM applications have been specialized, such as aerospace, automotive, communications, finance, insurance, manufacture, consumer goods/retail, energy/oil gas chemical, health care/clinical/medical/pharmaceutical and travel/transportation/hospitality, etc.

An industry-specific CRM application can be referred to as a vertical CRM application. Vertical CRM applications contain specialized business entities and processes designed to deal with the specific problems of the specific industries. For instance, an automotive CRM application might contain a "schedule maintenance" process for "vehicles", which is specific for the automotive industry but may not be applicable to other industries.

A CRM application deployed for a specific company may need further customization. For example, the owner of a particular automotive dealership might refer to its accounts as "clients" and require that vice president be always notified of new accounts in a business process.

Thus, a typically enterprise CRM application is tailored for a specific industry and for a specific company in the industry.

The need for highly tailored applications presents certain difficulties. For example, a highly tailored application may manage additional information about the processes and entities that are specific to a company. The additional information specific to the company is only valuable to the company requiring the tailoring but not to other companies.

Thus, highly tailored applications can be expensive. Since handling additional information generally requires additional resources either in memory or processing, highly tailored applications typically cost more to run than their untailored counterparts. Furthermore, the additional cost may have value only for a small set of companies. Other companies may not see the value, or see the tailoring as having negative value.

An enterprise CRM application is typically installed at a location specific to the company and tailored for the company. The company that sees the value of the customization typically pays for the additional cost of tailoring. If the customization is sufficiently valuable, the company with sufficient resources may undertake the tailoring.

A CRM application can also be installed at a host company, which provides access to the CRM application to different customers. Hosting is desirable from the point of view of some customer companies, because it allows the customer company to focus on its core business and the hosting company to specialize in hosting CRM application.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
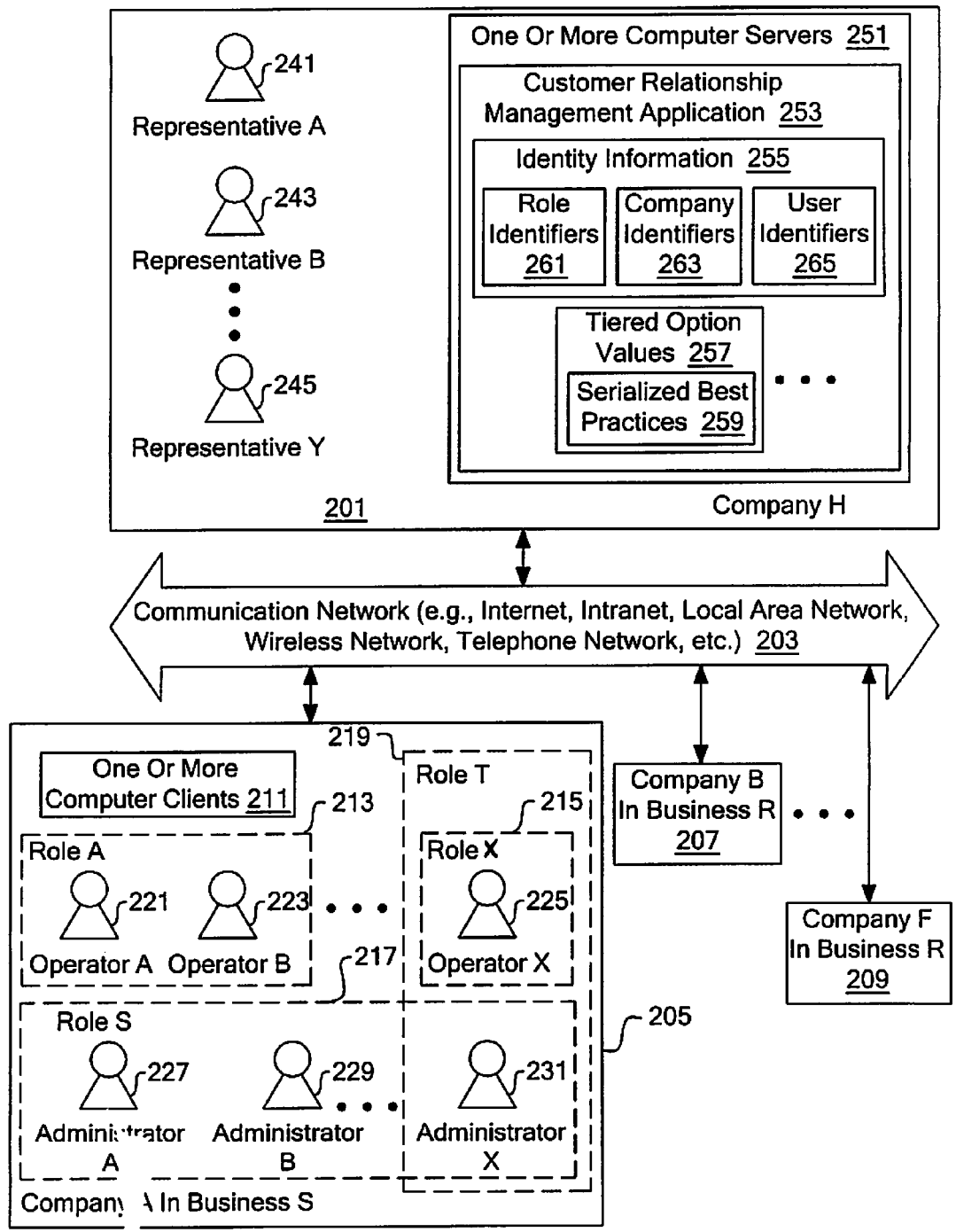
FIG. 1 shows a system to use a customization method according to one embodiment of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

In one embodiment of the present invention, an application with various options for different users has a tiered system for customization to provide cost efficiency. For example, in a tiered system for customization, multiple option values can be specified for one option at multiple tiers of user group hierarchy and resolved based on the tier hierarchy to balance the capability for deep customizability, and the efficiency of resource usage. For example, a deep customizable hosted Customer Relationship Management (CRM) application allows customization from company level to individual user level.

In one embodiment of the present invention, option values for options are grouped (e.g., to represent best practices) for selection by groups of users, such as users of companies of different industries of a hosted Customer Relationship Management (CRM) application. For example, serialized best practices can be grouped for use in the tiered system to provide option values for certain users or user groups.

One embodiment of the present invention provides an application, such as a Customer Relationship Management (CRM) application, to simultaneously serve multiple customer companies with a mix of industry specific features. For example, the application can be hosted to serve companies of different industries.

According to one embodiment of the present invention, a highly vertically tailorable hosted CRM application allows a hosting company to increase market penetration while minimizing the cost of hosting such applications. A vertically tailorable CRM application is customizable for a customer company which may not fit into a set of predetermined vertical lines of industries. The application can be customized for the company through mix and match of a set of primary vertical lines to generate a custom vertical line for the company.

A highly vertically tailorable hosted application allows economies of scale and differential customer billing and provides consistency in mix and match tailoring in a hosted CRM environment. It improves the economies of scale through allowing companies of multiple industry lines to generate customized versions of vertical CRM applications from the same base application so that the cost of the CRM application can be shared among a large base of customer companies.

According to one embodiment of the present invention, the application is broad, deep, tailorable, consistent, billable, cost efficient, and low footprint.

For example, a system according to one embodiment of the present invention allows simultaneous support of a broad and expanding set of industry specific verticals through mix and match.

For example, a system according to one embodiment of the present invention allows deep support of business processes and entities for various industries.

For example, a system according to one embodiment of the present invention allows a customer company to tailor their solution from the business processes and entities of multiple industries.

For example, a system according to one embodiment of the present invention maintains business process consistency, even in highly tailored configurations.

For example, a system according to one embodiment of the present invention allows a hosting company to bill customers differentially, such as on a per-seat, per-process or per-entity basis.

For example, a system according to one embodiment of the present invention maintains cost-efficiency at scale by co-locating all processes and entities on shared infrastructure that adapts to the customer's configuration.

For example, a system according to one embodiment of the present invention maintains a low per-user footprint by serializing best practice tailoring for cross customer company use.

FIG. 1 shows a system to use a customization method according to one embodiment of the present invention. In FIG. 1, a customer relationship management application (253) according to one embodiment of the present invention is hosted in company H (201), which has a number of representatives (e.g., 241, 243, . . . , 245). The representatives can help the customer companies (e.g., 205, 207, . . . , 209) to customize the application according the needs of the customer companies.

As illustrated in FIG. 1, the application (253) runs on one or more computer servers (251). The one or more computer servers may be a number of individual computers connected through a communication link (e.g., a local area network), a rack of server computers, or a single computer with multiple server programs that are collectively considered as the application (253). The application (253) may be implemented as a single program or multiple programs cooperating with each other.

In one embodiment of the present invention, the users are grouped in a number of ways. For example, the users can be grouped according to the companies they work for. For example, company A (205) in business S may have a number of operators (e.g., 221, 223, . . . , 225) who operate the customer relationship management application (253) to manage aspects of customer relation for company A (205). Company A (205) in business S may also have a number of administrators (e.g., 227, 229, . . . , 231) who may customize the customer relationship management application (253) specifically for company A (205).

The users of a company can also be grouped according to the roles the users play in using the customer relationship management application (253). For example, operators 221 and 223 of company A (205) has a role A (213); operator 225 has a role X (215); and administrators (e.g., 227, 229, . . . , 231) has a role S (217).

In one embodiment, a user has only one role. Alternatively, a user may have more than one role. For example, it may be specified that operator X (225) and administrator X (231) has a common role T (219) in additional to their different roles (215 and 217). Multiple roles can be concatenated as a single role. Or a user may choose to use one active role at a time. Further, in one embodiment, roles have a hierarchy system.

The users of the customer company (e.g., 205) can use one or more computer clients (e.g., 211) to access the customer relationship management application (253) through a communication network (203), such as Internet, intranet, local area network, wireless network, telephone network, etc. The users of the customer company may access the application directly using the computer clients, or through the representatives (e.g., 241, 243, . . . , 245). The users of the customer companies may place requests through telephone calls, emails, web browsers, client programs specifically designed for the customer relationship management application (253), etc.

The customer relationship management application (253) keeps records of the identity information (255) for the companies, the roles and the users to operate in accordance of the customization of the users and companies. Thus, from a company and a user point of view, the customer relationship management application (253) is tailored for the company and for the user.

In one embodiment of the present invention, multiple option values can be specified for an option in a plurality of tiers to tailor the application to meet the specific requirements of different companies and different users while maintain efficiency. For example, tiered option values (257) can be stored for customization at the company level, at the role level, and at the user level. An option value commonly used in a company can be specified for a company at the company level to avoid the need to individually specify the same value redundantly for multiple users of the company. Similarly, an option value commonly used for a role of a company can be specified for a role at the role level. The use of the company level and role level customization reduces the need for user level customization. However, individual users can still make their own choices when needed. Thus, the application provides efficiency and deep customizability.

Some of the examples use roles and companies to group users. Other types of schemes can also used to group users in a hierarchy. The users may be grouped according to the likelihood of using a common option value. For example, a CRM application of a company may have user groups for different departments, affiliations, subsidiaries, etc. In general, any scheme to group users in a number of levels of hierarchy can be used with the present invention. Different tiers can be created to represent the user group hierarchy.

In one embodiment of the present invention, a set of commonly used option values for a set of related options are grouped as an option group. For example, the option values representing the best practices can be serialized as an option group for selection. The best practices are likely to be used with no or little modification. Thus, the use of best practice options can significantly reduce the resources used for customization.

In one embodiment of the present invention, the serialized best practices (259) can also be used to specify option values at one or more tiers. The users selecting an option group of serialized best practices can be considered as a group of users. One embodiment of the present invention includes a tier of best practice for tiered customization.

In one embodiment, best practices represent proven methodologies for consistently and effectively achieving a business objective. In one embodiment, a business process includes a series of computerized activities organized to achieve a specific business objective. A best practice is typically a business process with demonstrated ability to achieve superior results. For example, Sales Forecasting is a general business process, while Triangulated Sales Forecasting is a best practice business process.

In one embodiment of the present invention, a set of option values can be used to specify a best practice business process. In other embodiments, a set of option values can be used to specify an optimized practice business process, a good practice business process, a better practice business process, a common practice business process, a shared practice business process, a proven effective practice business process, or other types of a business process.

In one embodiment, serialized best practices represent a set of option values typically used by a group of users. In other embodiments, a group of option values are serialized to represent one or more types of serialized practices (e.g., a good practice, a better practice, a best practice, a common practice, a shared practice, a proven effective practice, or other types of practices), which are typically used by a group of users. Thus, in general, the methods illustrated for serialized best practices can be used for various different types of option groups, which may be used by many different users, roles, and/or companies.

Best practices for customer relationship management can be derived from successful, extensive experience in selling, marketing, and service. A deep understanding of the best practices can be derived based on experiences from working closely with industry-leading companies in various deployments.

In one embodiment of the present invention, when one or more global options (e.g., universal options) are selected for a company, a type of businesses is determined; and a best practice option suitable for the type of businesses is automatically selected for the company. In one embodiment, when a task of a particular type is selected, a best practice option suitable for the type of tasks is automatically selected accordingly. Thus, the application helps the users in the customization process to provide relevant detailed recommended option values (e.g., proven effective ways of performing a particular task for a particular business field) based on other specified option values (e.g., global universal option values) so that the need to individually specifying options values for various options can be greatly reduced. Reducing individually specified options values also improves the efficiency of the system.

Alternatively, a hosting company can derive commonly used option sets from the individual options specified by the users. Through analyzing the distribution of options specified by the users, commonly used option sets can be identified and used.

In one embodiment of the present invention, the commonly used option sets (e.g., derived from the individual options specified by users) are not visible to the users. The application (e.g., 253) uses the commonly used option sets to reduce the resources used for customization. For example, the application may replace a number of options specified at a user level with the combination of an option set and another set of option values at the user level so that the resulting option values appear to be the same as the user specified option values. When such an approach is used, the practice of one customer company has no influence on the practice of another customer company. However, the application can still reduce the resource usage, which optimizes the performance and potentially reduces the hosting cost for the customer companies.

Alternatively, the commonly used option sets may be presented to the users so that individual companies using the host service may benefit from the common practices of other companies.

In one embodiment of the present invention, a based tier of option values is provided as system wide default values. Thus, without any customization, valid default values for the options are available for any user.

In general, different users may have different numbers of tiers of customization values. In one embodiment, customization tiers have priority ranks so that a plurality of option values specified at different tiers can be resolved into a single value for a particular user. Thus, although each user has the opportunity to specify a different option value, groups of users that use the same option value can specify the value at a group level to reduce the overall resource usage.

In one embodiment of the present invention, options of an application include: personalized options, universal options, and best practice options. Universal options relate to states and transitions for data in the system. Personalized options relate to presentation of tasks allowed by the system. Best practice options relate to option sets which represent best practices. For example, a best practice option may specify a set recommended option values for a set of personalized options in one embodiment; a best practice option may also specify a set recommended option values for a set of universal options in one embodiment. In an alternative embodiment, a best practice option may specify a set recommended option values for a set of combined personalized options and universal options.

In one embodiment of the present invention, a best practice option contains a set of serialized option values. The option values are serialized so that the option values are stored in a database in a file (e.g., an XML (Extensible Markup Language) file), or in a network message and the option values can be read (e.g., imported) into a running application.

In one embodiment, an option is universal if it:

defines a new data entity in the system (e.g., the definition of a custom field);

removes a data entity from the system (e.g., exclusion of solutions);

modifies the set of possible states for an entity in the system (e.g., the definition of a new pick list value);

defines a new transition between entity states (e.g., a workflow that creates an alert when a record is saved);

removes a transition between entity states (e.g., exclusion of the ability to delete service requests); and modifies a transition between entity states (e.g., the addition of rules to copy custom fields while converting leads to accounts).

In an alternative embodiment, more or less options can be defined as universal.

In one embodiment, personalized options change the presentation without changing the semantics of entities and transitions in the system. For example, changing the display label on an existing pick list value is changing a personalized option. Changing the display label does not change the identity of the pick list value. The identity is the part of the pick list value that is saved to the data entity. Consequently, changing the label does not change the meaning of the entity.

In one embodiment, specifying best practice options involve the association of a group of users (or a user) with a serialization of a specific set of universal or best practice options. A reference to serialized best practices uses fewer resources than the amount of data for specifying the best practice option values. When multiple users or user groups use serialized best practices, multiple copies of best practice option values can be avoided through the use of the references to the serialized best practices.

It is noted that degenerate cases of personalization exist. For example, the status value for "Open" on a service request could be personalized to read "Closed". One embodiment of the present invention uses user interface design to encourage users to avoid them. In one embodiment, the underlying semantic meaning is displayed beside any personalized label to help the users.

In one embodiment of the present invention, universal options are used to preserving consistency in a highly tailored system; and personalized options are used for communication to the users.

In one embodiment, a hosted application has three classes of users: customer service representatives, customer company administrators, and customer company employees. In an alternative embodiment, more or less classes of users can be defined.

Customer service representatives are employed by the hosting company. Customer service representatives (or their automated proxies) place tailoring requests against the system to provision customer companies and their employees based on the services that the customer company has purchased.

Customer company administrators are employed by the customer company. Customer company administrators place tailoring requests against the system for the employees of the company.

Customer company employees place operational requests against the system and can place limited tailoring requests.

Customer company employees typically perform CRM operations. Customer company administrators and customer service representatives typically do not perform CRM operations.

Customer service representatives and customer company administrators typically perform tailoring operations. Customer company employees may also access certain tailoring capabilities.

Customer service representatives may operate across different companies. Customer company administrators and customer company employees are only authorized to operate within their company domains.

Figure 2:
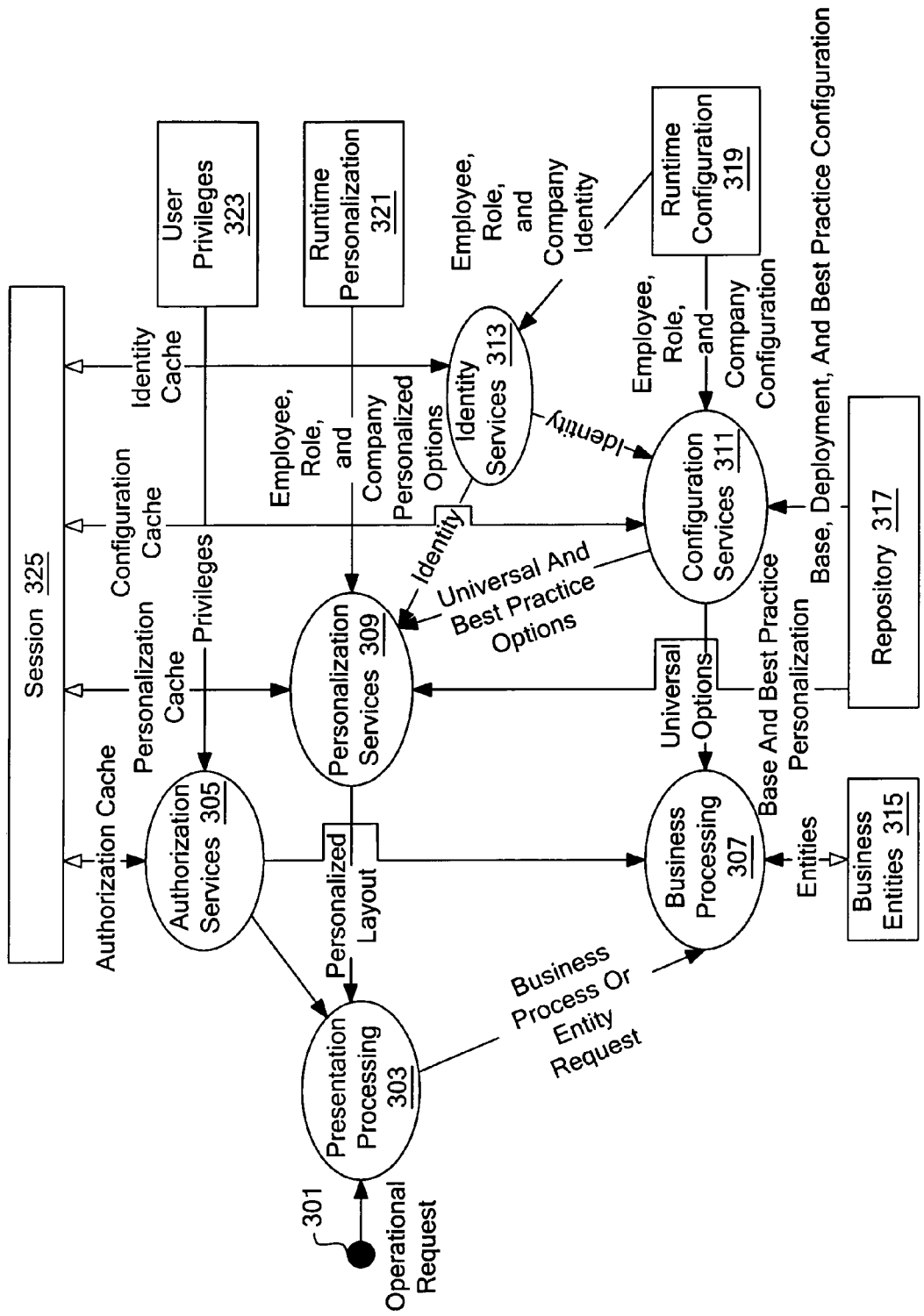
FIG. 2 shows an operational data flow using a customization method according to one embodiment of the present invention.
Figure 3:
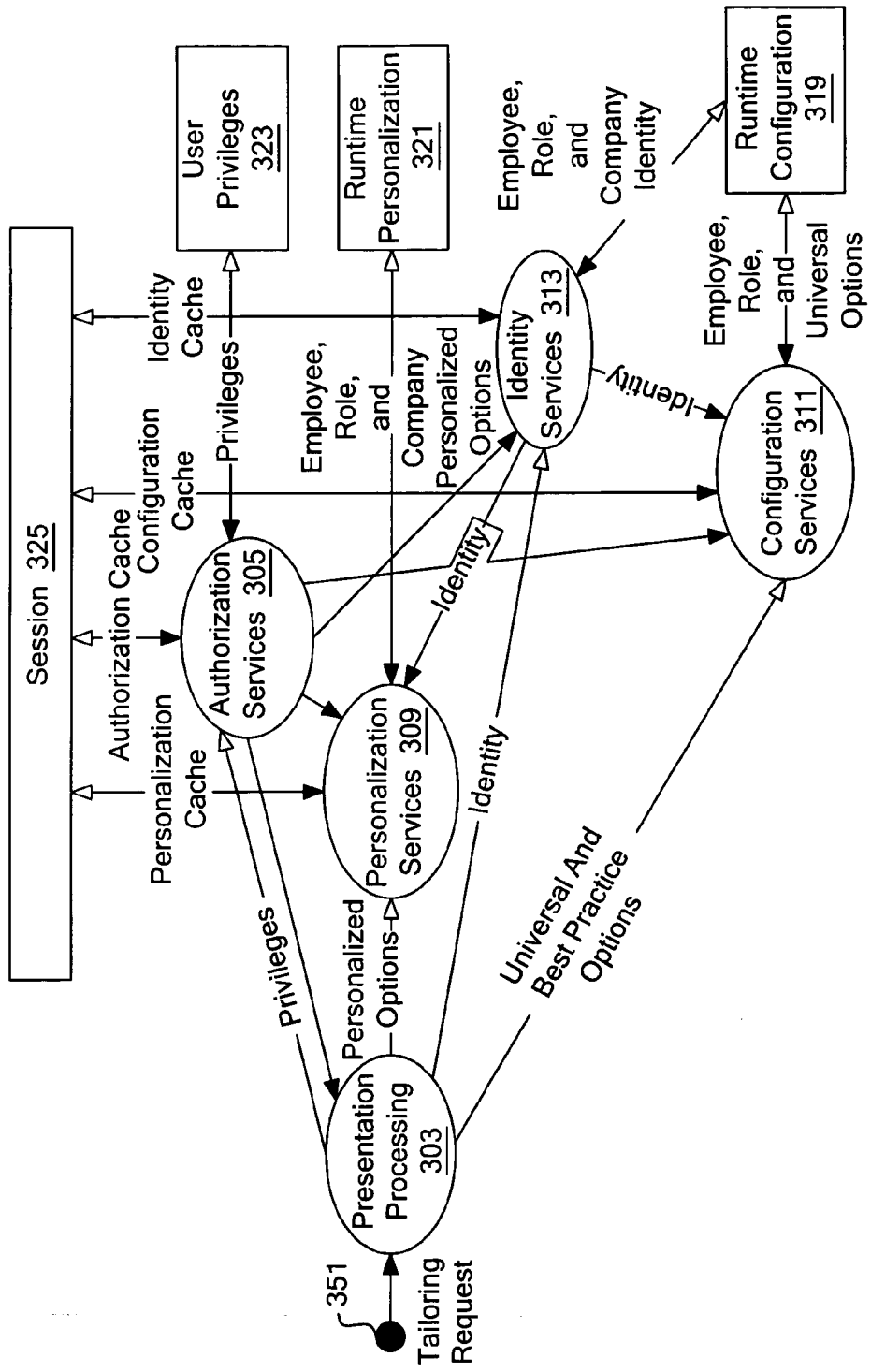
FIG. 3 shows a tailoring data flow using a customization method according to one embodiment of the present invention.

FIG. 2 shows an operational data flow using a customization method according to one embodiment of the present invention. FIG. 3 shows a tailoring data flow using a customization method according to one embodiment of the present invention. In FIGS. 2 and 3, solid arrows indicate a read data flow; and hollow arrows indicate a write data flow.

In FIG. 2, the operational flow of the system illustrates the behavior of the system during typical CRM operations. An operational request displays or transitions business entity state. CRM operations occur during regular operation of the CRM application, which is also known as runtime.

In FIG. 2, the tailoring flow of the system illustrates the behavior of the system during configuration operations. Tailoring requests do not affect CRM business entity state. One embodiment of the present invention provides tailoring capabilities to its customers at runtime like operational capabilities. Thus, the application can be tailored on the fly.

As illustrated in FIGS. 2 and 3, one embodiment of the present invention includes a number of components: presentation processing (303), authorization services (305), business processing (307), personalization services (309), configuration services (311), identity services (313), session (325), business entities (315), repository (317), runtime configuration (319), runtime personalization (321) and user privileges (323). It is understood that not all the components illustrated in FIGS. 2 and 3 are necessary. In one simplified environment, some of the components may be combined or eliminated. Further components may also be added for improved performance and/or efficiency. Further, certain arrangements, such as personalization services and configuration services can be rearranged with respect to other components, such as presentation processing. Thus, in alternative embodiments, more or less components can be used.

In one embodiment, a user request, such as an operational request (301) or a tailoring request (351) may be received from a user in a number of different ways. The user requests may enter the system from any input channel. For example, the request may be from an Internet browser, a Simple Object Access Protocol (SOAP) application, or an inbound piece of email. The channel is unimportant.

Typically, an authentication subsystem is also used to prevent unauthorized use, although it is not depicted in the data flow diagram in FIGS. 2 and 3. Typically, components of the system operate against the context of an authenticated user. The user is generally authenticated at login and re-verified with each request. The user generally indicates that they are done using the system at logout. In one embodiment of the present invention, user identifiers are used to identify the users over time.

In one embodiment, a three-tiered structure is used. Regardless of the input channel, user requests are processed at first two tiers and resulting artifacts are stored at a third tier, such as a typical three-tier architecture with a presentation tier, a business tier, and a data tier. It is understood that such tiered architecture is not necessary for the implementation of at least some of the methods of the present invention. In alternative embodiments, architecture of more or less tiers can be used.

In one embodiment, a presentation tier includes presentation processing (303) which handles translation of the inbound request to business process and entity requests that the business processing subsystem understands. In one embodiment, the presentation tier includes a web site to interface with users of web browser. Thus, a user of a web browser can access various components of the system through the presentation tier.

In one embodiment, a business tier includes business processing (307) which handles business process logic and retrieves business entity data from a data store.

In one embodiment, a data tier includes data store for business entity (315).

In one embodiment, the authorization services (305) provide security for the tiered application. The authorization services (305) reads privileges from user privileges (323) and provides privileges to various components. For example, during the process of the operational request (301) in FIG. 2, the authorization services (305) provide the privilege data to presentation processing (303) and business processing (307). For example, during the process of the tailoring request (351) in FIG. 3, the authorization services (305) provide the privilege data to presentation processing (303), personalization services (309), configuration services (311) and identity services (313). Operations are performed in accordance with the privileges of the requesting users. For improved performance, the privilege data may be cached (e.g., in session (325)).

In one embodiment, privileges are associated with the user identifiers. In general, any form of authorization services can be used.

In one embodiment, a data store for session (325) is used to keep user specific data at various levels for the length of a user's session. A session typically lasts from user login to user logout. Sessions are bound to particular users. Consequently, data in a session store is isolated to particular users. Authorization services (305), personalization services (309), configuration services (311), identity services (313) may use the data store for session to cache data.

In one embodiment, strong session affinity, or distributed sessions, is used for high availability (e.g., when multiple web servers are used together in presentation processing to serve multiple users simultaneously). Any known technologies for strong session affinity and distributed sessions can be used.

In one embodiment, a data store for repository (317) is used to store read only configuration data that is used by the application at runtime for configuration information. For example, in FIG. 2, repository (317) provides base, deployment and best practice configuration to configuration services (311) and provides base and best practice personalization to personalization services (309). Base repository data is typically shipped and deployed with the application.

In one embodiment, repository access is quick and memory footprint is assumed to be minimal relative to the usefulness of the data in memory. If a particular implementation of the repository is slow, it can be augmented with an in-memory cache. If the repository is large, the cache can implement a caching heuristic such as Least Recently Used (LRU), a rule which drops the portion of the cached data that is used less recently than any other portion to make room for other data. Hard coding is a considered degenerate but fast form of repository for base configuration.

In one embodiment, a data store for runtime configuration (319) is used to store identity information, universal options and best practice options. The user identifier of an authenticated user is associated with the information stored in the runtime configuration data store.

In one embodiment, the user identifier of a user in the system can be associated with a role identifier and a company identifier.

The role identifier uniquely identifies metadata concerning the user's duties within the company. Users may share roles within a company. A role identifier can be considered as representing a group of users who share the role identifier. In one embodiment, a role is unique within the system and constrained to a single company.

The company identifier uniquely identifies the customer company within the system. In one embodiment, users in a company share a company identifier which represents the company. A company identifier can be considered as representing a group of users who share the company identifier.

Thus, in one embodiment, users are grouped at the company level according to company identifiers and at the role level according to role identifiers. In one embodiment of the present invention, the tiered identity information is used for tiered personalization.

In one embodiment, universal options stored in the system are managed by the configuration services (311). A data store may contain many different sets of universal options. Universal options may be associated with the user, role, company, deployment, or base system. Not all embodiments of configuration services need allow option configuration on all levels. In alternative embodiments, universal options may be associated with more or less levels of user groups.

In one embodiment, the association between serialized best practices and system users are a subclass of universal option used in runtime cost optimization.

In one embodiment, the runtime configuration data store is in the form of a set of database tables. In one database embodiment, alphanumeric identifiers are used as the unique primary keys for the corresponding user, role, and company data entities. Universal options are stored as columns on the data entities in the database tables.

In one embodiment, a data store for runtime personalization (321) is used to store runtime personalized data and structured to efficiently allow retrieval of applicable levels of personalization for a particular user.

In one embodiment, the personalization options stored in the system are managed by the personalization services (309). A data store may contain multiple sets of personalized options.

In one embodiment, personalized options associate with users, roles, and companies through the identifiers provided by the data store runtime configuration (319). These identifiers are used to retrieve data from the runtime personalization (321).

In one embodiment, the runtime personalization data store is in the form of a set of database tables. In the database embodiment, personalization options are grouped by function and associated with identifiers by storing the identity values in indexed columns. In this way, a full set of personalization options for a user can be retrieved quickly by a single table query with a limited set of OR clauses operating on index columns.

In one embodiment, identity services (313) provide access to the user identity portions of the runtime configuration (319). During operation, identity services (313) retrieve the role identifier based on a user identity and retrieve the company identifier based on the user identity. In one embodiment, a company identifier is retrieved directly based on a user identifier. Alternatively, a company identifier can be retrieved based on the role identifier which is retrieved based on the user identifier.

In one embodiment, the identity services (313) provide the tailoring abilities to: create employees in their company; create roles in their company; and associate roles with employees in their company. Thus, through a tailoring request, an authorized user, such as a customer company administrator, can create new users for a corresponding company, create roles for the company and assign roles to users of the company. The data of user identifiers, role identifiers, company identifiers are stored in the runtime configuration (319). In an alternative embodiment, identity services may perform more or less operations.

In one embodiment, the access control in the identity service is based on privileges retrieved from the authorization services. In one embodiment, customer company employees have no direct access to the identity services. In one embodiment, customer service representatives can have direct access to identity service (313) for different companies. Further, the customer service representatives can create customer company identifiers and create user identifiers for customer company administrators.

In one embodiment, the identity services (313) provide identity information to the personalization service (309) and the configuration services (311) for resolving option values from the tiered customization system.

In one embodiment, role identifiers and company identifiers are cached in the identity cache area of the session data store.

In one embodiment, configuration services (311) provide access to universal and best practice options.

In one embodiment, configuration services (311) read configuration information from the runtime configuration (319) and the repository (317). The configuration data retrieved from the runtime configuration (319) is filtered using identity information obtained from the identity services (313).

In one embodiment, configuration services (311) resolve the tiered configuration values into the set of universal and best practice options that apply to the user.

In one embodiment, during operational requests, configuration services (311) provide universal and best practice options to the personalization services (309) for use in the generation of personalized layout. Configuration services (309) also provide universal options to business processing (307).

In one embodiment, during tailoring requests, configuration services (311) provide system users with access to modify universal and best practice options, subject to privileges provided by the authorization services (305).

In one embodiment, frequently accessed options from the runtime configuration (319) are cached in the configuration cache area of the session (325).

In one embodiment, personalization services (309) allow access to tailored vertical user interface.

In one embodiment, personalization services (309) read personalization information from the runtime personalization (321) and the repository (317). The personalization data retrieved from the runtime personalization (321) is filtered using identity information obtained from the identity services (313). The best practice personalization data retrieved from the repository (317) may be filtered using best practices options obtained from related configuration services (311).

In one embodiment, during operational requests, personalization services (309) choose appropriate personalization values to form a personalized layout for presentation processing (303).

In one embodiment, during tailoring requests, personalization services (309) provide system users with access to modify personalized options, subject to privileges provided by the authorization services.

In one embodiment, frequently accessed options from the runtime personalization (321) are cached in the personalization cache area of the session (325).

In one embodiment, a presentable user interface results from a tiered customization system which provides various ways of tailoring.

In one embodiment of the present invention, tiers of personalization options are defined with a base tier that is always present. Thus, there is at least one valid option value for a tailorable option.

In one embodiment of the present invention, certain tiers can be tailored at runtime based on access control, such as a tier for employee personalization options, a tier for role personalization options, and a tier for company personalization options.

In one embodiment of the present invention, the tiered personalization is applied to a consistent business model resulting from options for universal business entities and processes.

Figure 4:
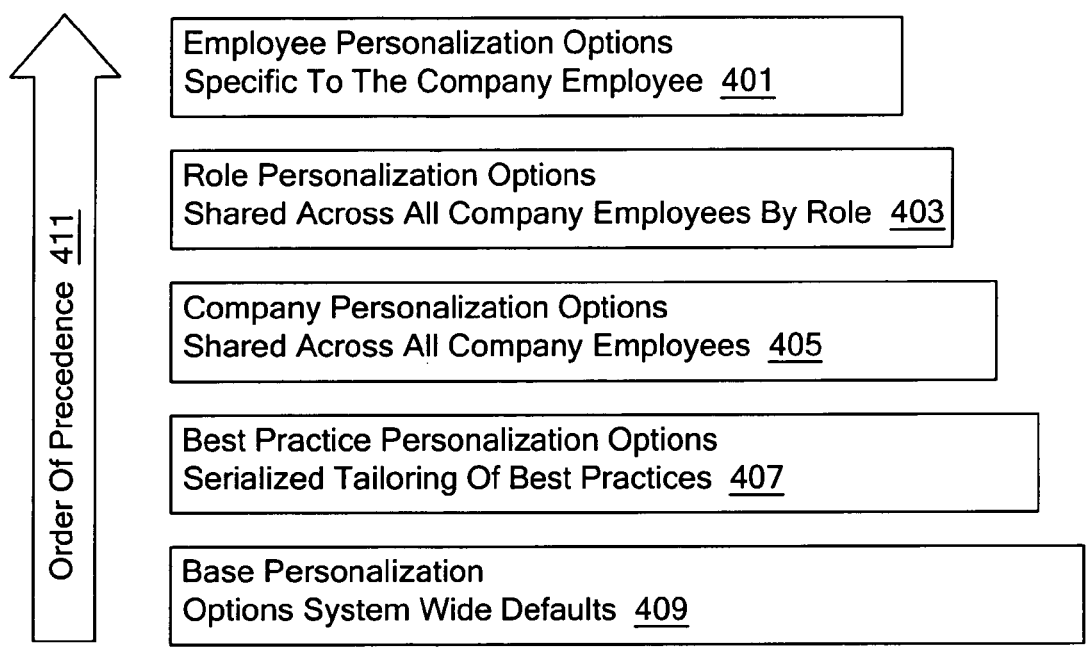
FIG. 4 shows an example order of precedence of personalization according to one embodiment of the present invention.

In one embodiment of the present invention, tiers of option values can be specified for hierarchical groups of users. FIG. 4 shows an example order of precedence of personalization according to one embodiment of the present invention.

In FIG. 4, in the increasing order of precedence (411), base personalization options (409), best practice personalization options (407), company personalization options (405), role personalization options (403) and employee personalization options (401) can be specified for different groups of users.

In an alternative embodiment, more or less tiers of personalization with similar or different order precedence can be used. For example, best practice personalization may further include tiers for user, role, company, etc.

In FIG. 4, the tiers of options (e.g., 401-409) describe alternative levels of personalization for the option. The set of option values applicable to one level is driven by the presentation requirements of the presentation option. Not all of personalization options need to use all tiers. In one embodiment, the option values are valid at least in the base personalization tier.

In one embodiment, base personalization options (409) provide system wide defaults, which are used for users who do not have option values specified in tiers above the tier of base personalization options (409).

In one embodiment, best practice personalization options provide serialized tailoring of best practices for groups of users which select the corresponding best practice personalization options. For example, a company identifier may be associated with a best practice identifier to indicate that the serialized best practices are applicable to the users of the company. Similarly, the best practice identifier may be associated with role identifiers or user identifiers.

In one embodiment, the option values of the serialized best practices supersede the corresponding option values of the tier of base personalization options (409). The best practice personalization options (407) are used for users that do not have option values specified in tiers above the tier of best personalization options (407).

In one embodiment, company personalization options (405) are shared across company employees. Company personalization options (405) supersede the corresponding option values of the tier of best personalization options (407), if any, and the corresponding option values of the base personalization options (409).

In one embodiment, role personalization options (403) are shared across company employees. Role personalization options (403) supersede any existing option values of the tier of company personalization options (405), any existing option values of the tier of best personalization options (407), and the corresponding option values of the base personalization options (409).

In one embodiment, employee personalization options (401) are specific to company employees. Employee personalization options (403) supersede, any existing option values of the tier of role personalization options (403), any existing option values of the tier of company personalization options (405), any existing option values of the tier of best personalization options (407), and the corresponding option values of the base personalization options (409).

Figure 5A:
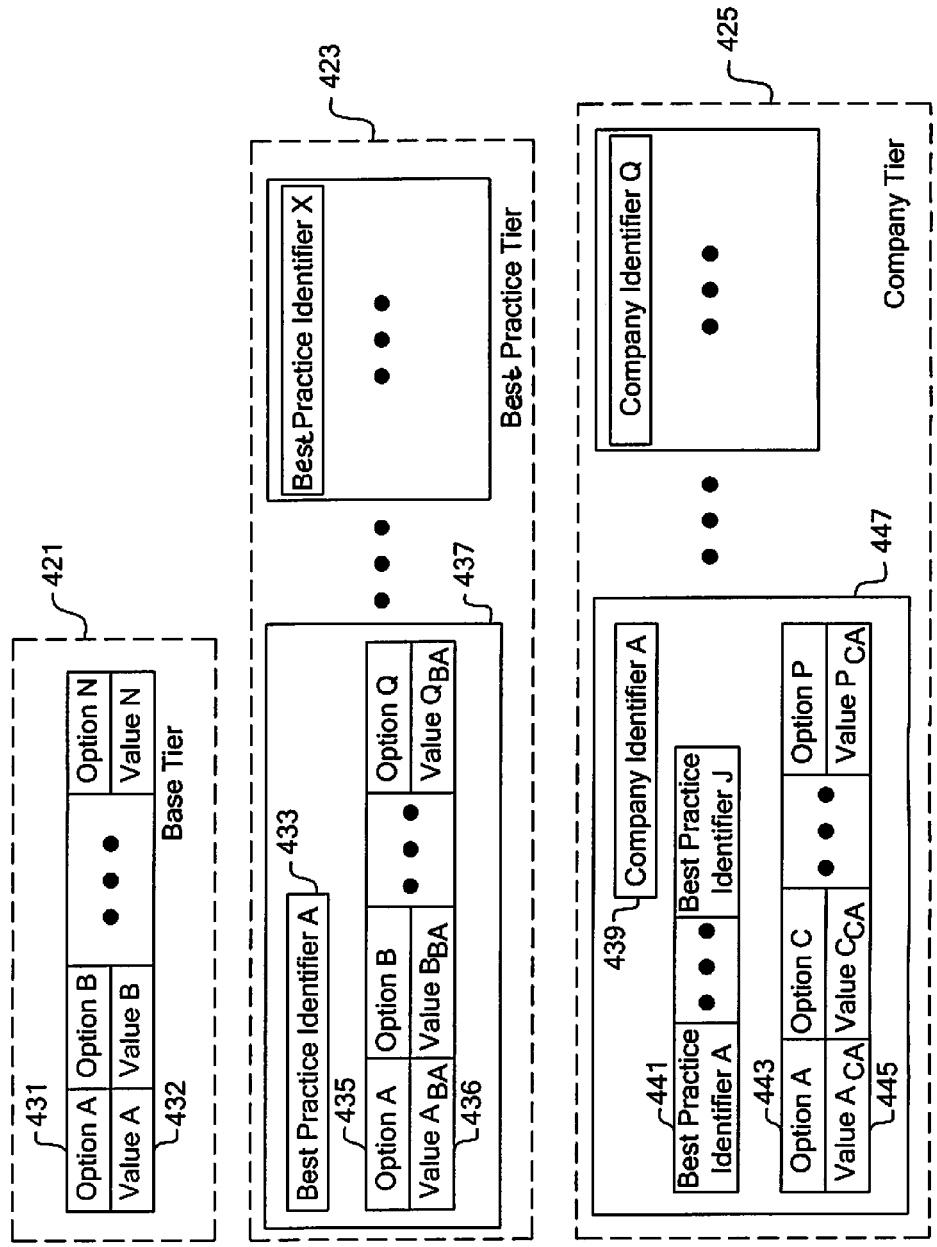
FIG. 5 illustrates an example of tiered option values according to one embodiment of the present invention.
Figure 5B:
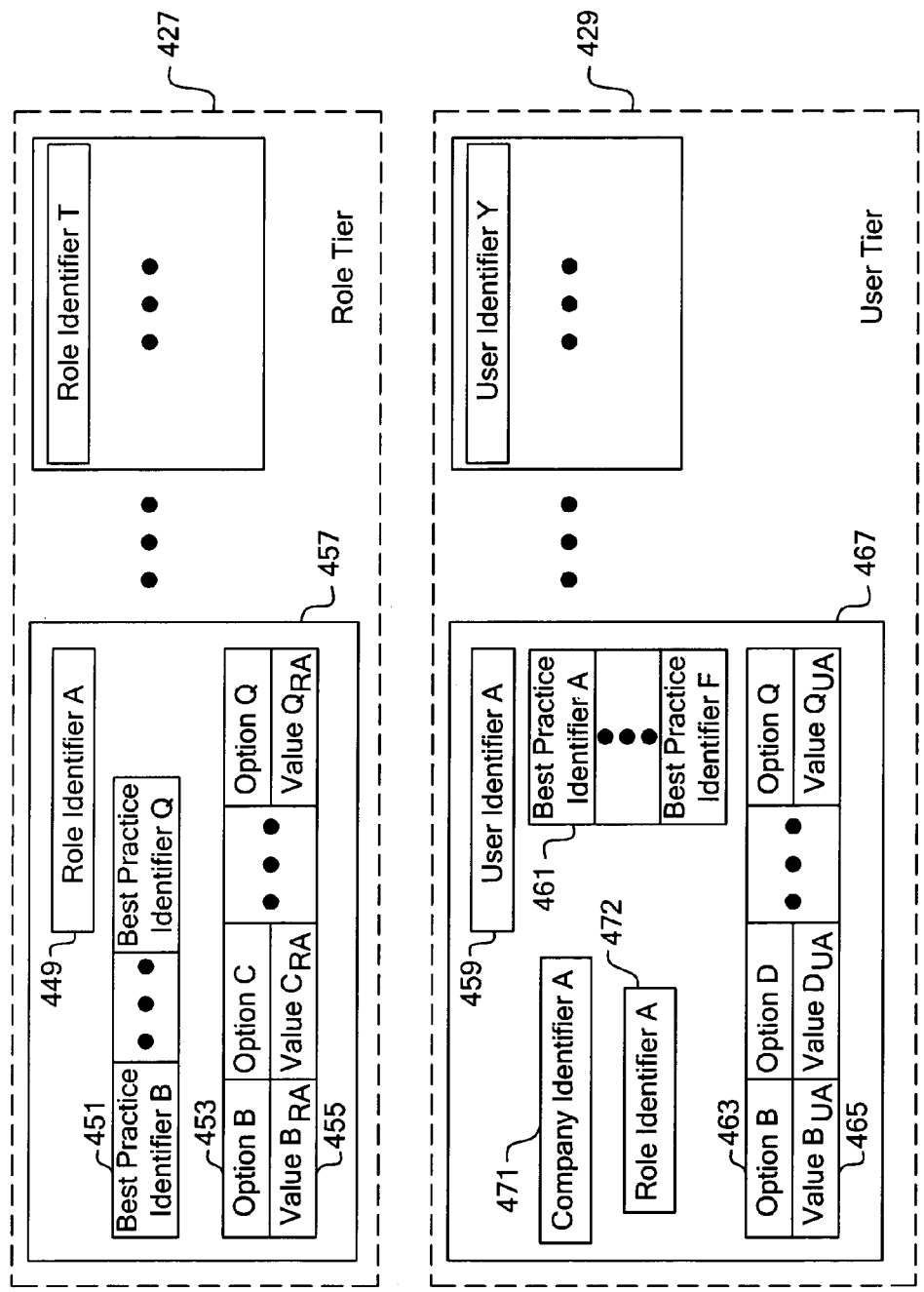

FIG. 5 illustrates an example of tiered option values according to one embodiment of the present invention.

In FIG. 5, a base tier (421) includes values for various options available in the system. For example, option A (431) has a system wide default value A (432). Similarly, the base tier (421) includes option values for other options (e.g., value B for option B, . . . , value N for option N). In one embodiment, the base tier (421) can be used to specify default option values various option types (e.g., personalized options and universal options). Similarly, options of various different types can be specified in other tiers (e.g., best practice tier, company tier, role tier, user tier, etc.). The base tier (421) may be hard coded, or stored in a read only repository (e.g., 317), or in a database. A portion of the base tier (421) may be cached.

In FIG. 5, a best practice tier (423) includes groups of option values for groups of options. For example, a best practice identifier (433) represents a group (437) of options for best practices. The group (437) includes information indicating the association of options and option values, such as option A (435) and value $A_{BA}$ (436) and others (e.g., option B and value $B_{BA}$, . . . , option Q and value $Q_{BA}$) A number of best practice identifiers (e.g., best practice identifier A, . . . , best practice identifier X) can be used to represent a number of best practice option groups. The best practice tier (423) may be hard coded, or stored in a read only repository (e.g., 317), or in a database. A portion of the best practice tier (421) may be cached for fast access.

In FIG. 5, a company tier (425) includes personalization at the company level. For example, a company identifier (439) represents a company; and information 447 represents the personalization for a company represented by a company identifier (439). The company identifier (439) is associated with a number of best practice identifiers (e.g., 441) to indicate the use of particular best practice options for the company with the company identifier (439). One or more best practice identifiers (e.g., best practice identifier A . . . , best practice identifier J) can be associated with a company identifier (e.g., company identifier A) to indicate the selection of the option values represented by the corresponding best practice identifiers. The details of best practice options can be retrieved using the best practice identifiers. The company identifier (439) can be further associated with one or more option and value pairs, such as option A (443) and value $A_{CA}$ (445), option C, value $C_{CA}$, . . . , option P and value $P_{CA}$, to indicate the company tier personalization. Different companies (e.g., represented by company identifier A, . . . , company identifier Q) can have different personalization values.

In FIG. 5, a role tier (427) includes personalization at the role level. For example, a role identifier (449) represents a role; and information 457 represents the personalization for a role with a role identifier (449). The role identifier (449) is associated with a number of best practice identifiers (e.g., best practice identifier B(451), . . . , best practice identifier Q) to indicate the use of particular best practice options for the role with the role identifier 449. The details of best practice options can be retrieved using the best practice identifiers. The role identifier (449) can be further associated with one or more option and value pairs, such as option B (453) and value $B_{RA}$ (455), option C, value $C_{RA}$, . . . , option Q and value $Q_{RA}$, to indicate the role tier personalization. Different roles (e.g., represented by role identifier A, . . . , role identifier T) of different companies can have different personalization.

In FIG. 5, a user tier (429) includes personalization at the user level. For example, a user identifier (459) represents a user; and information 467 represents the personalization for a user with a user identifier (459). The user identifier (459) is associated with a number of best practice identifiers (e.g., best practice identifier A(461), . . . , best practice identifier Q) to indicate the use of particular best practice options for the user with the user identifier (459). The details of best practice options can be retrieved using the best practice identifiers. The user identifier (459) can be further associated with one or more option and value pairs, such as option B (463) and value $B_{UA}$ (465), option D, value $D_{RA}$, . . . , option Q and value $Q_{RA}$, to indicate the user tier personalization. Different users (e.g., represented by user identifier A, . . . , user identifier Y) of different companies can have different personalization values.

In FIG. 5, a user identifier A (e.g., 459) is associated with a company identifier (e.g., 471) and a role identifier (e.g., 472) to indicate user groups and the hierarchy of user groups.

In FIG. 5, an option (e.g., option A) can have multiple values (e.g., value A (432), value $A_{BA}$ (436), value $A_{CA}$ (436)) specified at multiple tiers for users. It is not necessary to specify the value of an option at all tiers. Different tiers may specify different sets of options.

In one embodiment, identity services (313) are used to manage information relating to the hierarchy of user groups. In one embodiment, the role identifiers are associated with user identifiers to specify the group of users by roles; and the company identifiers are associated with role identifiers to specify the groups of roles by company. The identity services (313) can then be used to determine the role and company identifiers for a given user identifier to indicate the company and the role of the user.

FIG. 5 shows an example of tiers of options and identifiers of one embodiment of the present invention. In an alternative embodiment, more or less tiers can be used.

In one embodiment of the present invention, a customer company administrator or a customer service representative may specify the role personalization options and the company personalization options.

In one embodiment of the present invention, the application may automatically use role personalization options and company personalization options to improve performance and reduce resource usage. For example, when the system detects that a large portion of the users of a company use a common option value, the system may automatically uses the company personalization option in combination of additional employee personalization options to replace the original set of personalization options for the company. The use of the company level personalization reduces the uses of personalization at the user level. Alternatively, the system may select or create a role to use a role personalization option in combination of personalization options to replace the original set of the personalization option.

In one embodiment of the present invention, runtime tailoring operations can be performed at the Employee (or user), Role, and Company personalization tiers. In one embodiment, the values for base personalization options are deployed as part of the application, which are stored in the read-only repository (317). Alternatively, the base personalization may also be changed at runtime. Since the values for the base personalization options may be used for a large number of users of different customer company, a change in the base personalization option values can have a wide spread impact.

In one embodiment, employee personalization options apply to particular customer company employees. They are tailorable by the corresponding customer company employees, or by customer company administrators or customer service representatives on their behalf.

In one embodiment, role personalization options apply to a group of customer company employees that share a common role within the company. Since role personalization options may affect multiple users within the scope of a single company, they are only tailorable by customer company administrators of the corresponding company in one embodiment. Alternatively, other authorized users may also change the role personalization options.

In one embodiment, company personalization options apply to all customer company employees and customer company administrators within a company. Since company personalization options may affect the users within the scope of one company, they are only tailorable by customer company administrators for the corresponding company in one embodiment. Alternatively, other authorized users may also change the role personalization options.

In one embodiment, there is at least one valid personalization value available in the personalization tiers. For example, in one embodiment, valid personalization options exist at least at the base personalization tier so that there is at least one valid option value for any option. In one embodiment, personalization option values are valid at the base personalization tier. Further, in one embodiment, the base personalization tier is a read only aspect of the deployment.

In one embodiment, presentable interfaces for various configurations are generated through the use of the base personalization tier, a tight method for presenting write operation options, and a loose method for presenting read operation options. The tight and loose methods relate to options involving enumeration.

In one embodiment, the system divides personalization options into options involving enumeration and simple options which do not involving enumeration.

In one embodiment, for options involving an enumeration, the system groups the personalization options for enumeration membership into sets. This allows a tier to specify a narrower enumeration than the base tier. Alternatively, a tier may also specify a broader enumeration than the base tier.

In one embodiment, a personalization option set includes: the displayed set of pick list values (which values are shown as part of the selectable list), and a displayed field (e.g., the label of the pick list a form).

When a selection of a tier for an enumerated option set is combined with simple options for the display values of the enumeration members, the method of personalizing membership in an enumeration appears to strictly come from a single tier. The set of enumeration members typically matches the personalization set specified on one tier. For example, when no duplicated personalization sets are specified in the tiers, only one tier has a personalization set matches the set of enumeration members. Indicating the enumeration member set is described as tight personalization.

Tight personalization reflects the contents of the enumeration. In one embodiment, it is used when displaying possible selections when performing write operations. For example, when a personalization option reduces the set of enumeration members from one tier (e.g., the base tier) to another tier (e.g., the employee tier) for a user, available input option values for the user will be limited to the reduced set of enumeration members. Thus, the option value chosen by the user tightly conforms to the personalization of the enumeration member set of the highest precedence among the enumeration member sets specified in various tiers for the user.

Requests to retrieve the display value for a particular enumeration member appear to constitute a membership set that comes from multiple tiers. A display value is presented without showing the exact the personalized set of enumeration member from which the display value is selected. The display value may be considered as selected from one of multiple tiers of enumeration sets. For example, when multiple different personalization sets containing the display value are specified in the tiers, multiple personalization sets can be the source of the selection of the display value. Ignoring the enumeration member set is referred to loose personalization.

Loose personalization ignores enumeration. In one embodiment, it is used when displaying current state of enumerated values. For example, when an option value is to be presented for a user, the option value may be strictly limited to the enumeration member set of the highest precedence for the user. If the user selected a personalization option to reduce the set of enumeration members from one tier (e.g., the base tier) to another tier (e.g., the employee tier), an option value in the broader, lower precedence set but not in the narrower, high precedence set can also be presented. Thus, for the presentation of an option value, the option value can be loosed considered as taken from any of the tiers specified for the user. Thus, the presentation of an option value loosely conforms to the union of the enumeration member sets specified in various tiers for the user.

In one embodiment of the present invention, the presentation processing (303) makes the choice of tight or loose personalization relating to enumerations.

Figure 6:
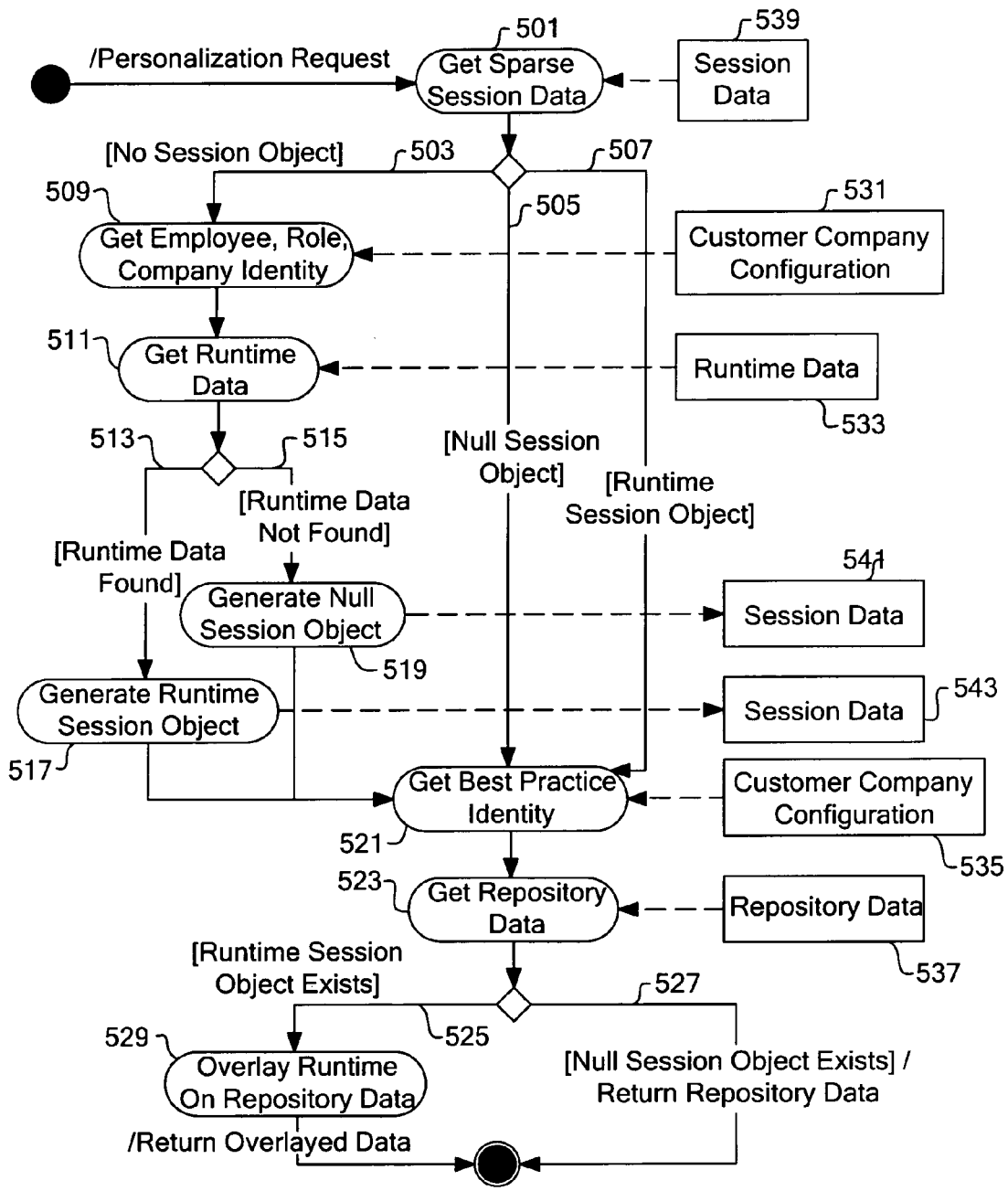
FIG. 6 shows a method to retrieve personalized data according to one embodiment of the present invention.

FIG. 6 shows a method to retrieve personalized data according to one embodiment of the present invention.

Two tiers of personalization may appear in conflict when they specify different values for one personalization option. In one embodiment, operations are performed to resolve such conflict. For example, in FIG. 6, operation 511 to get runtime data and operation 523 to get repository data resolve different values from different tiers into a value for an option.

In FIG. 6, responsive to a personalization request, operation 501 optionally retrieves sparse session data from the session data (539). The sparse session data is retrieved so that only data relevant to the request is processed.

When there is no session object (503), operation 509 gets employee, role and company identity from the customer company configuration (531). Operation 511 gets runtime data from the runtime data (533). If runtime data is found (513), operation 517 generates a runtime session object, which is stored in session data (543); otherwise, operation 519 generates a null session object, which is stored in session data (541).

When there is a session object (e.g., 505, 507 or after operation 517 or 519), operation 521 gets best practice identity from the customer company configuration (535). Operation 523 gets repository data from repository data (537).

If a runtime session object exists (525), operation 529 overlays runtime on repository data; and the overlaid data is returned. Otherwise, when a null session object exists (527), the repository data is retrieved.

In one embodiment, when a personalization option tier conflict occurs, the system resolves the conflict by using the value from the tier of the highest precedence, such as in accordance with the precedence illustrated in FIG. 4. For example, in FIG. 4, employee personalization overrides other personalization (and so on).

In FIG. 6, the use of a sparse session cache is optional. A simpler uncached embodiment can be used when a customer company configuration data store is capable of providing sufficient runtime performance. In an uncached embodiment, the system skips activities involving the session data store in FIG. 6.

In FIG. 6, the use of sparse runtime data is optional. When it is advantageous to restrict the data kept in the customer company configuration and session data stores, a simpler embodiment may be used without the use of sparse runtime data. In a simpler embodiment, the runtime object may not be sparse; and the complete overlay of runtime data on repository data may be performed.

In one embodiment, the option value is determined according to the precedence of the tiers. Different personalization tiers are searched from the tier with the highest precedence (e.g., the employee tier) to the tier with the lowest precedence (e.g., the base tier) until a valid option value is found. For improved performance, some of the frequently used option values may be stored in cache.

One embodiment of the present invention uses serialization of best practices to reduce the amount of resources consumed by options in the system.

In one embodiment, best practice serialization is used when:

1. there is a set of options that are generally encoded together as part of a best practice, such as a form layout; and 2. a sufficient number of users exists who would use the best practice personalization instead of individual customization of the options (e.g., at the user level) to positive affect system resource usage.

In an alternative embodiment, more or less criteria can be used in determining the use of best practice serialization.

It is not efficient to serialize a single option as a best practice if the option is no bigger than the reference to the best practice. In this degenerate case, it may be more efficient to personalize individually.

Sufficient users using a best practice serialization justify the best practice serialization if two or more personalization instances are expected to be replaced with the best practice serialization for a process. In one embodiment, it is assumed that the underlying system does not use inter-process shared memory, which is a safe assumption in modern operating systems.

In one embodiment, a best practice serialization can be applied across option types.

In one embodiment, serialized best practices include a serialization of a series of options, an identifier for the serialization, and an association with company, role, or employee.

In one embodiment, the association between a company, role, or employee and the best practice takes the form of a reference to the best practice identifier in an attribute of the company, role, or employee entity.

In one embodiment, tailoring of best practice identifier is exposed based on business needs similar to tailoring of configuration options.

In one embodiment, best practice option values are stored in repository as a collection of XML (Extensible Markup Language) files with in memory caching of read XML data converted to a simpler data structure.

In one embodiment, best practice serialization for small best practices in XML (a subset of the entire option) is stored as a child element structure of the top level element describing the object in the repository for fast retrieval of the best practices and for the presence of the base object.

In one embodiment, large best practices (e.g., same size as the base object) are serialized as a separate XML document. The XML document is retrievable based on the best practice identifier.

In an alternate embodiment, best practices are stored in a database, in a way similar to a runtime personalization database. A configuration can be associated with the best practice identifier instead of the company, role, or employee identifier.

A best practice identifier can be considered as representing a group of users which share the same best practice identifier, in a way similar to users sharing the same company identifier or the same role identifier.

Figure 7:
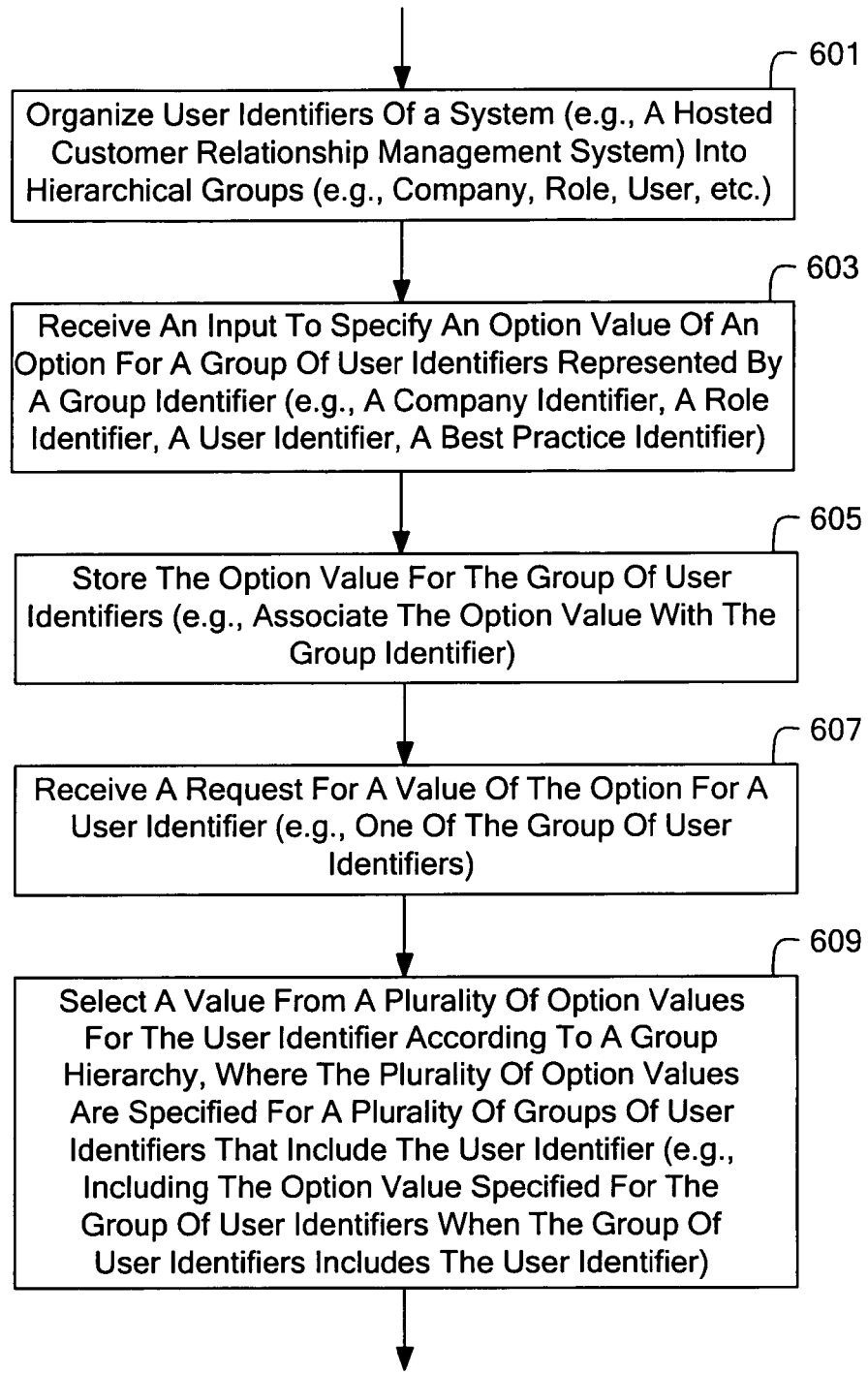
FIG. 7 shows a method of tiered personalization according to one embodiment of the present invention.

FIG. 7 shows a method of tiered personalization according to one embodiment of the present invention. In FIG. 7, operation 601 organizes user identifiers of a system (e.g., a hosted customer relationship management system) into hierarchical groups (e.g., company, role, user, etc.). For example, a number of groups can be at a company tier, indicated by association of user identifiers with company identifiers. A number of groups can be at a role tier, indicated by association of user identifiers with role identifiers.

A group in one tier may completely or only partially include a group in another tier. For example, the users in a company completely include the users of a role in the company. Users associated with a best practice identifier (e.g., at the role level) may not completely include the users of a company in which some of the users are associated with the best practice identifier through role identifiers.

After operation 603 receives an input to specify an option value of an option for a group of user identifiers represented by a group identifier (e.g., a company identifier, a role identifier, a user identifier, a best practice identifier), operation 605 stores the option value for the group of user identifiers (e.g., associate the option value with the group identifier). Operations 603 and 605 can be repeated for different user groups and for different user identifiers. It is understood that a single user can also be considered as a degenerated case of a group of users.

After operation 607 receives a request for a value of the option for a user identifier (e.g., one of the group of user identifiers), operation 609 selects a value from a plurality of option values for the user identifier according to a group hierarchy, where the plurality of option values are specified for a plurality of groups of user identifiers that include the user identifier (e.g., including the option value specified for the group of user identifiers when the group of user identifiers includes the user identifier).

Thus, in one embodiment, the option values can be specified in tiers for one option. The tiers have a hierarchy so that, if more than one option value is specified in the tiers, the hierarchy can be used to select one for a particular user.

Figure 8:
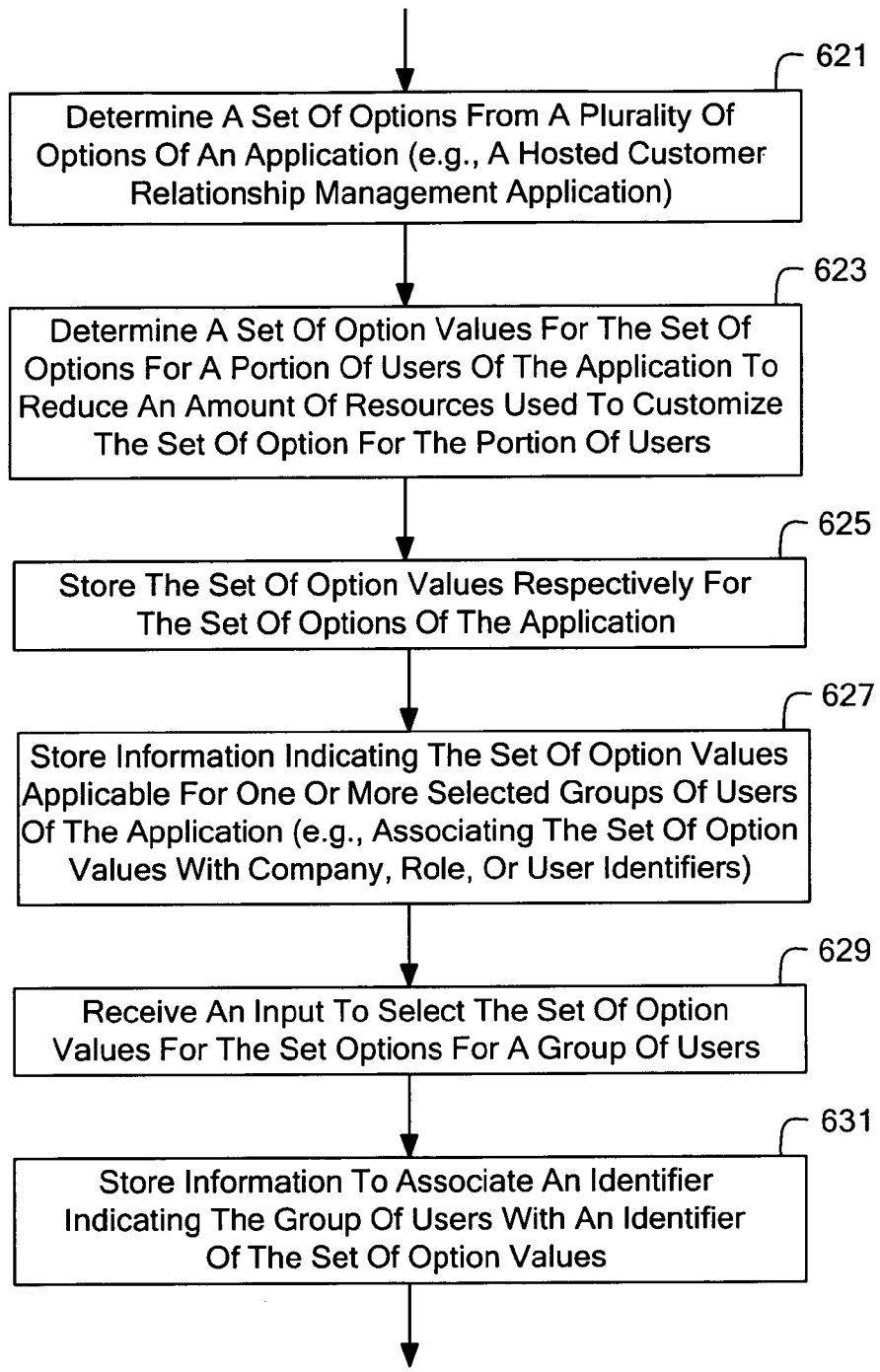
FIG. 8 shows a method of serialized best practices according to one embodiment of the present invention.

FIG. 8 shows a method of serialized best practices according to one embodiment of the present invention. In FIG. 8, operation 621 determines a set of options from a plurality of options of an application (e.g., a hosted customer relationship management application). Operation 623 determines a set of option values for the set of options for a portion of users of the application to reduce an amount of resources used to customize the set of option for the portion of users.

In one embodiment of the present invention, the set of options are selected so that the size of an identifier for the set of option values is smaller than the size of the set of option values. Thus, resources can be saved when the customization of specifying the set of option values can be replaced with specifying the identifier of the set of option values.

Further, in one embodiment of the present invention, the set of options are grouped when the set of options are to be used by at least more than two instances so that the use of the identifier to refer to the set of options can save overall resources.

In one embodiment, the set of option values represent best practices, such as a form layout, or a business process. The set of option values may specify aspects of a user interface, or the option of a business process, or a combination of both.

In one embodiment, the set of option values are determined before the execution of the application system; and the set of option values as best practices can be stored in a read-only repository. Alternatively, the set of option values are specified at runtime. Further, in one embodiment, the set of option values can be generated automatically from the data representing user specified option values.

Operation 625 stores the set of option values respectively for the set of options of the application. Operation 627 stores information indicating the set of option values applicable for one or more selected groups of users of the application (e.g., associating the set of option values with company, role, or user identifiers).

In one embodiment, after operation 629 receives an input to select the set of option values for the set of options for a group of users (e.g., for a company, for a role, or for a user), operation 631 stores information to associate an identifier indicating the group of users with an identifier of the set of option values.

In one embodiment, the set of option values can be associated with identifiers of user groups of different hierarchy level (e.g., company, role, user). A number of different groups of different hierarchy level can be used to include a particular user. Thus, different option values sets may be specified for a particular user at different tiers of the hierarchy.

In one embodiment, the hierarchy of the user groups is used to resolve the multiple specifications into one. For example, when the option value sets completely overlap with each other in the options specified, the option value set associated with the user group with the highest precedence is used. When the option value sets partially overlap with each other in the options specified, the option values for the overlapping options are taken from the set associated with the user group with the highest precedence.

In FIGS. 7 and 8, particular operation sequences are illustrated as examples. It is understood that in general different operation sequences can be used. The operations are not limited to the particular examples illustrated in FIGS. 7 and 8.

In one embodiment, various services, such as personalization services (309), configuration services (311), identity services (313), etc., interact with the data store for session (325) as if it were a part of a read-through cache.

In one embodiment, a number of session rules are used to ensure high availability for the hosted CRM application.

In one embodiment, the read-through cache pattern uses a proxy interface in front of the primary data store interface that checks a faster cache data store to see if the object is present there.

Read-through caching by itself covers the high availability case where the application fails over to a secondary cache store when querying for unmodified primary data. In this case, the data is seamlessly re-read into the new cache store without the caller being aware of the failure.

To cover the case where the primary data has changed immediately prior to secondary cache fail over, one embodiment of the present invention uses the following rules for cached data.

1. Cached data is immediately and directly written to the primary data store; and
2. Updates to cached data cause the cache to flush, but not repopulate.

In an alternative embodiment, more rules can be used.

In one embodiment, the subsequent operational requests cause repopulation.

In one embodiment, when the above rules are used, the modified primary data case resolves into the unmodified primary data case.

In one embodiment, service caching attempts to take advantage of shared settings across a role or company. For example, a global cache based on a role or company key can be used. Such an implementation may be preferred if the system is optimizing for large companies or few servers.

In one embodiment, neither identity, nor personalized layout, nor universal options are taken as being subject to authorization during operational requests. Instead, the presentation and business processing centers are responsible for using authorization when providing processing. This keeps options from being confounded with security.

In one embodiment, personalized layouts are not used for security because the presentation of a business entity or process is irrelevant when considering whether the business entity or process is accessible. Alternate presentations might expose the entity or process at other times.

Typically, universal options are a poor substitute for security since entity state is typically not related to the accessor of the entity. Entity attributes exist regardless of whether the user can access them. Consequently, full entity states are considered for transitions regardless of the user.

In one embodiment, identity services avoid the operational need for authorization by returning data that is only of relevance to the user. A user is allowed to know their company and role affiliation. This information can be used when the users discuss themselves with others.

In one embodiment, during tailoring the identity services, the personalization services and the configuration services respect authorization. In addition to keeping with the best practice of making these services exposed to presentation processing self-securing, this allows the system to control provisioning through security.

One embodiment of the present invention includes a system and method of option management that allows a hosted CRM application to economically support vertical CRM applications that are highly tailored for each customer.

In one embodiment, CRM configuration options include personalized options, universal options, and best practice options. Methods are presented to separate options into the classes and to manage the options of the classes. One embodiment provides operational and runtime tailoring capabilities for these classes of options.

In one embodiment, option management capabilities are distributed to users in a manner that ensures that the hosting company is able to differentially bill customers for use of resources.

In one embodiment, a single hosted application infrastructure accommodates for security methods, components, and data stores for option data. The extension of a common infrastructure provides footprint minimization for a hosted system.

One embodiment of the present invention includes methods for caching system data to speed application response and preserve application high availability.

One embodiment of the present invention includes universal business entities and processes, provisioned access control, tiered personalization, and serialized best practices.

In one embodiment, runtime tailoring capabilities and the use of a common infrastructure provide tailored vertical CRM applications which may be operated in a manner that is cost efficient for the hosting company.

In one embodiment, separating universal options from personalized options preserves business model consistency. This allows the "mix and match" of tailoring and allows consistency when business entities are hosted over time.

CRM business model consistency is the ability of the user to perceive entities in the CRM system to exist in a valid state. Tailoring and especially "mix and match" tailoring may challenge this perception.

Consider the case where two verticals of CRM have partially disjoint pick lists for a single business entity attribute. In this case, mixing the two verticals on a single business entity store may produce invalid business entity states for users of each version of the pick list. Furthermore, users of the opposing vertical may skip any processes that depended on the states inappropriately.

In one embodiment, to prevent potential inconsistency, the system:

1. defines tailoring that affects business entity state universally as configuration options;
2. defines tailoring that affects business processes universally as configuration options;
3. defines methods for combining configuration option sets into universal option sets for tailoring of the CRM system;
4. defines methods for resolving configuration options that are related to multiple levels of configurability;
5. defines methods for transforming existing CRM business entities and processes for compatibility with the preceding methods;
6. separates the presentation of state to personalization options;
7. uses tiered personalization to ensure the existence of presentable interface for all personalized configurations; and
8. provides billable entities and processes through provisioned access control.

In an alternative embodiment, more or less operations can be performed to prevent potential inconsistency.

Combining pick lists from two different verticals of CRM is an example of a general option set combination operation. In one embodiment, options are combined using the following operations.

1. Assign a unique system identifier to the set member values.
2. Constitute a single master set using the identifiers from the initial sets.
3. Normalize identifiers in the master set that correspond to a single entity state. The normalization is performed so that multiple values from the initial sets will end up corresponding to the same identifier in the master set.
4. Place the two identifier-to-value mappings in a tier of the tiered personalization algorithm.
5. Define a base identifier-to-value personalization mapping.
6. Revise the entity states to be expressed in terms of the identifiers instead of the values. This includes references to entity state in business processing.
7. Provide the ability for presentation processing to display both tightly and loosely personalized value mappings based on the tiered personalization model.

In an alternative embodiment, more or less operations can be performed to combine options.

It is understood that the single option combination method is a degenerate case of the general option set combination method with only one value in each initial set. Hierarchical options can be viewed as sets for nodes in the hierarchy.

In one embodiment, a method of universal option resolution includes the following operations.

1. Determine the levels where the universal option is configurable. The levels may include: base (universally applies to users of a system), deployment (depends on the hosting company), company, role, employee, etc.
2. Determine the order of precedence for each level of configuration.
3. Determine whether a serialized best practice may economize on system resources.
4. If company, role, or employee levels are present,
   a. determine the subset of the option that are runtime configured.
   b. factor the remainder of the option into the base, best practice, and deployment levels.
   c. define a configuration cache sub-area and naming criteria for the subset. The naming criteria may include a level name identifier if more than one applies.
   d. write read-through caching that:
      i. retrieves the subset from the runtime configuration data store;
      ii. chooses the appropriate options based on precedence; and
      iii. stores the chosen subset in the configuration cache for efficiency on subsequent requests (also eliminating the need for subsequent precedence tests).
5. If base, best practice, or deployment levels are present,
   a. determine the full serialization of the options for the repository;
   b. write code to retrieve the repository data and choose the appropriate level based on precedence.
6. If both runtime and repository results are required and the runtime subset is smaller than the full option, overlay the runtime results on the repository results to form a complete option.

In an alternative embodiment, more or less operations can be performed for universal option resolution.

Slow repository is a degenerate case that can be improved by placing a read-through cache in front of the repository. A fast runtime configuration data store is a degenerate case that allows omission of the read-through cache by retrieving and choosing configuration data with calls.

There may be conflicts in pre-existing Business Entity and Process Universality.

In one embodiment, the following degenerate cases for universal option management have been identified: Is A entity conflict, Exclusive entity conflict, Additive process conflict, and Absolute process conflict. An alternative embodiment may include more or less degenerate cases for universal option management.

An "Is A" entity conflict occurs in cases where an entity in a vertical or tailoring is a superset of the functionality provided by a base or vertical entity.

In one embodiment, to resolve an "Is A" entity conflict, following operations are performed.

1. Identify the subset.
2. Develop a serialization of the subset. Use it for the smaller entity.
3. Place the remainder of the serialization of the larger entity in a serialization which refers to the subset serialization.
4. Rework the business processes to manage the subset entity as a sub-process of managing the superset entity.

An "exclusive" entity conflict occurs where two entities interpret the same underlying serialization in different manners.

In one embodiment, to resolve an "exclusive" entity conflict, following operations are performed.

1. Create a third entity containing the non-conflicting attributes common to each of the two initial entities.
2. Treat each conflicting entity as an "Is A" conflict with the new entity and resolve as above.

An "additive" process conflict occurs when two disconnected processes operate on disjoint attribute sets of the same entity.

In one embodiment, to resolve an "additive" process conflict, the processes are chained. Since the attributes are disjoint, ordering is unimportant.

An "absolute" process conflict occurs when two disconnected processes operate on a partially disjoint attribute set of the same entity.

In one embodiment, to resolve an "absolute" entity conflict, following operations are performed.

1. Identify the attributes and processes involved.
2. Define a set of options for each rational order of resolution given the business process.
3. Provide the option set at the appropriate levels for the individuals affected by the conflict.
4. Use the results of the option set to resolve the overlapping attributes.
5. Resolve the remainder as an "additive" process conflict.

In an alternative embodiment, more or less operations can be performed to resolve conflicts in pre-existing Business Entity and Process Universality.

Further details regarding the universal aspects of a process to create configuration options, address conflicts, effect transformation, etc, can be found in a related application entitled "Methods and Apparatuses for Providing Hosted Tailored Vertical Application", Ser. No. 11/001,358, filed on the same day with the present application, which is incorporated herein by reference.

One embodiment of the present invention uses provisioned access control to allow differential billability based on service subscription.

In one embodiment, the system provides: restrictions on the characteristics of privileges in the system and a general pattern for securing CRM options in a manner that may be provisioned.

In one embodiment, to qualify for provisioned access control, the privileges are securely grantable and traceable.

In one embodiment, a securely grantable privilege in a hosted CRM system has two aspects.

First, the privilege has a corresponding privilege controlling the ability to grant the first privilege. This property is recursive. Consequently, a privilege may exist to allow grant of the grant privilege.

Second, the system is able to restrict the ability to grant privileges to two scopes based on the class of user. Employees of the customers have their grant and revoke rights restricted to within the customer company. Employees of the hosting company are able to grant and revoke rights across companies.

In one embodiment, privileges in the system may or may not be securely grantable. In one embodiment, securely grantable privileges are provided for services that may be differential billed.

In one embodiment, a traceable privilege can be queried by an internal reporting system that also understands the employee, role, and company structure of the Runtime Configuration Data Store.

In one embodiment, privileges in the system may or may not traceable. In one embodiment, traceable privileges are provided for services that may be differential billed.

In one embodiment, a database table is used for the implementation of privileges with a database based runtime configuration data store. The privilege entity has a self-reference for grant, a simple user key for programmatic validation of privilege ownership, and a sufficient description for display to each class of system user.

Alternatively, the traceable property may also be implemented using an external billing service or through the use of an audit trail.

In one embodiment, the system uses grant privileges to provision companies in the following way.

1. At deployment, customer service representatives are given the ability to grant securely grantable privileges.
2. Customer service representatives are given the ability to grant and revoke grantable privileges across companies. Other users may grant and revoke within their company but not across companies.
3. If a customer company purchases a billable service, the customer service representative grants any related privileges to one or more customer company administrators.
4. If the customer company purchases a billable service that can be provisioned to customer company employees, the customer service representative grants the grant privilege to the customer company administrator and either party may further grant the billable privilege to the customer company employees.

In an alternative embodiment, more or less classes of users can uses grant privileges to provision access in the different way.

In one embodiment, the traceable history of the privilege grant and revoke can be used to generate the differential billing based on available services.

In one embodiment, the system uses provisioned access control to complete the mix and match tailoring made possible by business universality and tiered provisioning. In one embodiment, the tailoring capability is provided in the following way.

1. For major vertical features, privileges, grant privileges and grant privileges for the grant privileges are defined.
2. For mix and match features that the customer company purchases, a customer service representative gives the customer company administrator the grant privileges and the grant privileges for the grant privileges.
3. Once provisioned, the customer company administrator mixes and matches by giving the base privilege to customer company employees based on their needs.
4. The system configuration and personalization can be tailored based on business needs. This can be done by either the customer company administrator or by the customer service representative as a service.

In an alternative embodiment, tailoring capability can be provided through more or less classes of users using more or less operations in a similar or different way.

In one embodiment of the present invention, since the business process is universal, no configuration can result in inconsistent business entity state.

In one embodiment, since the presentation processes rely on tiered personalization, configurations and personalization are presentable for users.

Further details regarding provisional access control can be found in a related application entitled "Methods and Apparatuses for Providing Provisional Access control for Hosted Tailored Vertical Applications", Ser. No. 11/000,767, filed on the same day with the present application, which is incorporated herein by reference.

Thus, in one embodiment, a hosted CRM application system has one or more of the following features.

1. Business processes and entities are defined universally.
2. Presentation processes support tiered personalization.
3. Resources are optimized through serialized best practices.
4. Access to services is controlled in a manner that can be independently provisioned.

In one embodiment, methods for the implementation of a hosted CRM application system include at least some of:
1. service interaction with session data store;
2. service interaction with authorization;
3. generating universal configuration options;
4. resolution of universal option conflicts;
5. resolution of pre-existing business entity and process universality conflicts;
6. definition for personalization using tiers;
7. interaction between tailoring requests and presentation tiers;
8. tight and loose personalization based on tiers;
9. resolution of personalized option conflicts for tiers;
10. interaction between tailoring requests and best practices;
11. determining whether to apply best practice serialization;
12. storage of serialized best practices in a repository;
13. storage of serialized best practices in a database;
14. characteristics of privileges for provisioned access control;
15. using privileges for provisioning; and
16. provisioned access control and mix and match tailoring.

In one embodiment, a hosted CRM application system can be highly tailored for a specific customer.

In one embodiment, hosted CRM applications may be broad and deep while still being consistent despite tailoring because of the consistency provided to business processing by universality and the independence of personalization from configuration.

In one embodiment, hosted CRM applications have a low footprint because their operations are dynamically hosted at runtime using a single runtime framework implemented through various components according to embodiments of the present invention.

In one embodiment, hosted CRM applications resulting can achieve cost efficiency through: serialized best practices, runtime option subsets, and runtime overlay over static repository options to minimize resource usage, robust configurability, robust personalization, and grantable privileges to minimize support costs and low footprint to minimize both usage and support.

In one embodiment, despite tailoring hosted CRM applications can remain billable through the use of provisioned access control.

Although host CRM applications are described as examples for the illustration of various methods of embodiments of the present invention, at least some of the methods are not limited to the hosted CRM application.

For example, the tiered personalization according to one embodiment of the present invention can be used with non-hosted applications. In general, the tiered personalization can be used when users of an application can be grouped into hierarchical user groups.

Similarly, serialized best practices can also be used in different application systems.

Many of the methods of the present invention may be performed with a digital processing system, such as a conventional, general-purpose computer system. Special purpose computers, which are designed or programmed to perform only one function, may also be used.

Figure 9:
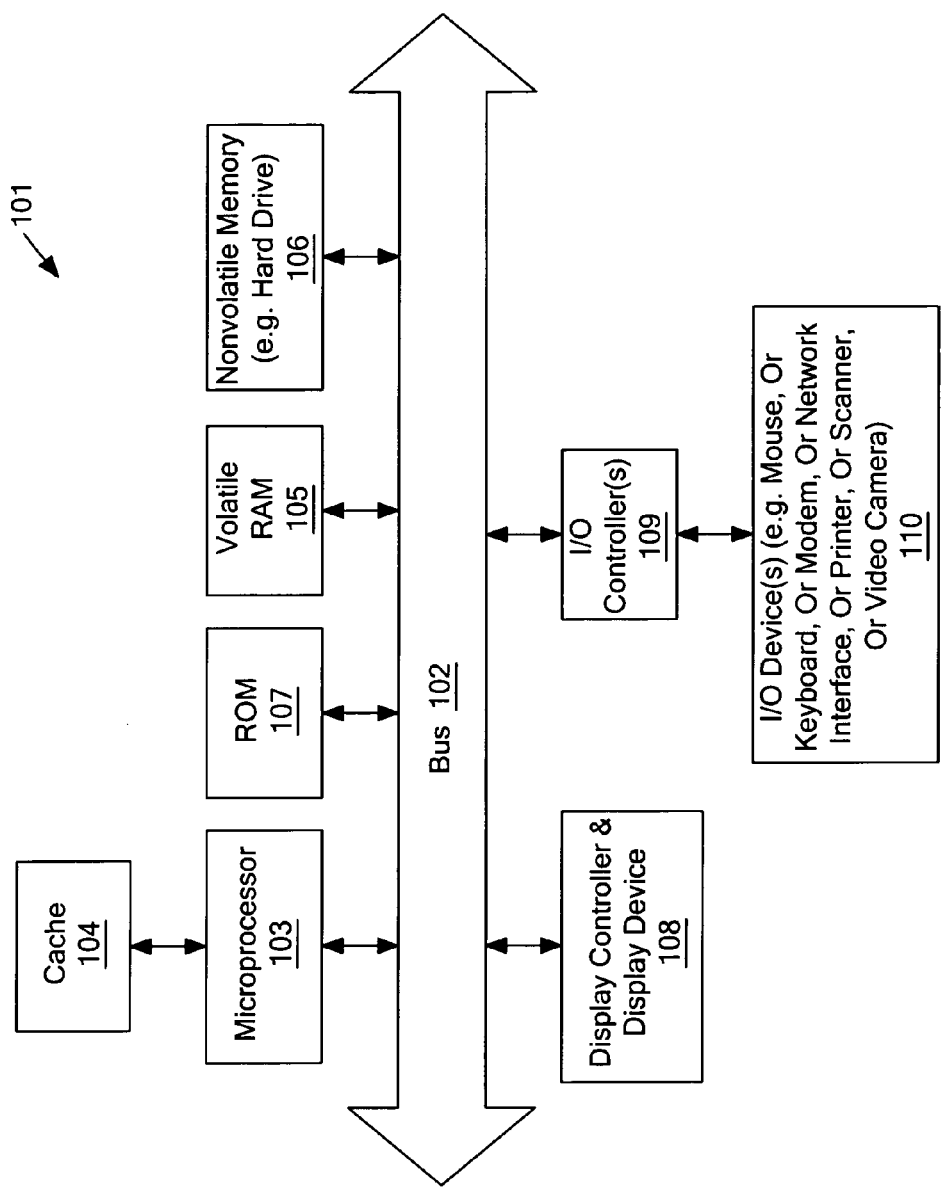
FIG. 9 shows a block diagram example of a data processing system which may be used with the present invention.

FIG. 9 shows one example of a typical computer system which may be used with the present invention. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 9 may, for example, be a server in a server rack, a workstation, or a personal computer (PC), a handhold computer, etc.

As shown in FIG. 9, the computer system 101, which is a form of a data processing system, includes a bus 102 which is coupled to a microprocessor 103 and a ROM 107 and volatile RAM 105 and a non-volatile memory 106.

The microprocessor 103 is coupled to cache memory 104 as shown in the example of FIG. 9. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art.

Typically, the input/output devices 110 are coupled to the system through input/output controllers 109.

The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required.

While FIG. 9 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface.

The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 9. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer readable storage medium storing executable computer program instructions which, when executed by a digital processing system, cause the system to perform a method, the method comprising:
    responsive to a request for a value of an option for an application for a user represented by a first user identifier, determining a first value of the option from a plurality of option values, based upon the first user identifier; and
    customizing the application for the user, based upon the first value of the option, wherein
        the application is hosted for simultaneous access by a plurality of users of a plurality of organizations,
        each of the plurality of option values is specified at a respective one of a plurality of hierarchical tiers, and
        determining the first value comprises:
            identifying an organization identifier associated with the first user identifier, wherein the organization identifier identifies a first organization of the plurality of organizations, and wherein the first organization comprises the user;
            determining whether the plurality of option values comprises an organization value associated with the organization identifier in an organization tier of the plurality of hierarchical tiers;
            identifying a role identifier associated with the first user identifier, wherein the role identifier identifies a first role of a plurality of user roles in the first organization, and wherein the user performs the first role in the first organization; and
            determining whether the plurality of option values comprises a role value associated with the role identifier in a role tier of the plurality of hierarchical tiers;
            determining whether the plurality of option values comprises a user value associated with the first user identifier in a user tier of the plurality of hierarchical tiers; and
            selecting a highest precedence option value as the first value of the option.

2. The medium of claim 1, wherein one of the plurality of option values specified at a highest precedence tier of the plurality of tiers is determined as the first value.

3. The medium of claim 1, wherein the option of the application specifies an appearance of a user interface element.

4. The medium of claim 3, wherein the application is to be executed on a server data processing system; and the option of the application is for generation of the user interface on a client data processing system connected to the server data processing system through a network.

5. The medium of claim 4, wherein the application comprises a Customer Relationship Management system.

6. The medium of claim 1, wherein the option involves enumeration; the first value is allowable in a union of enumeration member sets of the option specified in a plurality of tiers for the first user identifier.

7. The medium of claim 6, wherein when a second value is specified for the option for the first user identifier, the second value is limited to a highest precedence one of enumeration member sets of the option specified in a plurality of tiers for the first user identifier.

8. A method, comprising:
    responsive to a request for a value of an option for an application for a first user identified by a first user identifier, selecting a first value of the option from a plurality of option values, based upon the first user identifier; and
    customizing the application for the user, based upon the first value of the option, wherein
        the application is hosted for simultaneous access by a plurality of users of a plurality of organizations,
        each of the plurality of option values is specified at a respective one of a plurality of hierarchical tiers, and
        determining the first value comprises:
            identifying an organization identifier associated with the first user identifier, wherein the organization identifier identifies a first organization of the plurality of organizations, and wherein the first organization comprises the user;
            determining whether the plurality of option values comprises an organization value associated with the organization identifier in an organization tier of the plurality of hierarchical tiers;
            identifying a role identifier associated with the first user identifier, wherein the role identifier identifies a first role of a plurality of user roles in the first organization, and wherein the user performs the first role in the first organization; and
            determining whether the plurality of option values comprises a role value associated with the role identifier in a role tier of the plurality of hierarchical tiers;
            determining whether the plurality of option values comprises a user value associated with the first user identifier in a user tier of the plurality of hierarchical tiers; and
            selecting a highest precedence option value as the first value of the option.

9. The method of claim 8, wherein one of the plurality of option values specified at a highest precedence tier of the plurality of tiers is determined as the first value.

10. The method of claim 8, further comprising:
    receiving an input from a second user represented by a second user identifier to specify a second one of the plurality of option values as an option value for a second group of user identifiers, wherein the second group of user identifiers comprises the first user identifier; and
    storing the second one of the plurality of option values for the second group of user identifiers;
    wherein the second user identifier is different from the first user identifier.

11. The method of claim 10, wherein the second one of the plurality of option values is received and stored at runtime of the application.

12. The method of claim 10, wherein the second group of user identifiers is a group of user identifiers with a common role identifier or a common organization identifier.

13. The method of claim 12, wherein the first group of user identifiers includes a group of user identifiers with a common option set identifier, the option set identifier representing a set of option values for a set of options including the option of the application.

14. The method of claim 8, further comprising:
combining at least two of the plurality of option values to determine the first value for the first user identifier.

15. A customer relationship management system, comprising:
one or more data storages to store a plurality of option values for an option for an application, wherein each of the plurality of option values is specified at a respective one of a plurality of hierarchical tiers; and
one or more processors coupled with the one or more data storages, the one or more processors configured to:
responsive to a request for a value of the option for the application for a first user identified by a first user identifier, select a first value of the option from the plurality of option values, based upon the first user identifier; and
customize the application for the user, based upon the first value of the option, wherein
the application is hosted for simultaneous access by a plurality of users of a plurality of organizations,
each of the plurality of option values is specified at a respective one of a plurality of hierarchical tiers, and
determination of the first value comprises:
identification of an organization identifier associated with the first user identifier, wherein the organization identifier identifies a first organization of the plurality of organizations, and wherein the first organization comprises the user;
determination of whether the plurality of option values comprises an organization value associated with the organization identifier in an organization tier of the plurality of hierarchical tiers;
identification of a role identifier associated with the first user identifier, wherein the role identifier identifies a first role of a plurality of user roles in the first organization, and wherein the user performs the first role in the first organization; and
determination of whether the plurality of option values comprises a role value associated with the role identifier in a role tier of the plurality of hierarchical tiers;
determination of whether the plurality of option values comprises a user value associated with the first user identifier in a user tier of the plurality of hierarchical tiers; and
selection of a highest precedence option value as the first value of the option.

16. The system of claim 15, wherein the plurality of tiers further comprises:
a base tier at which an option value is specified for any user of the system.

17. The system of claim 16, wherein the base tier, the company tier, the role tier and the user tier are in an increasing order of priority; and for a same user an option value specified in a high priority tier supersedes an option value specified in a low priority tier.

18. The system of claim 15, wherein the option has option values specified in a first subset of the plurality of tiers for a first user and option values specified in a second subset of the plurality of tiers for a second user; the first subset is different from the second subset.

* * * * *